April 13, 1937.  W. H. CARRIER  2,077,038
SEALING AND THRUST BALANCING DEVICE
Filed April 5, 1934  2 Sheets-Sheet 1
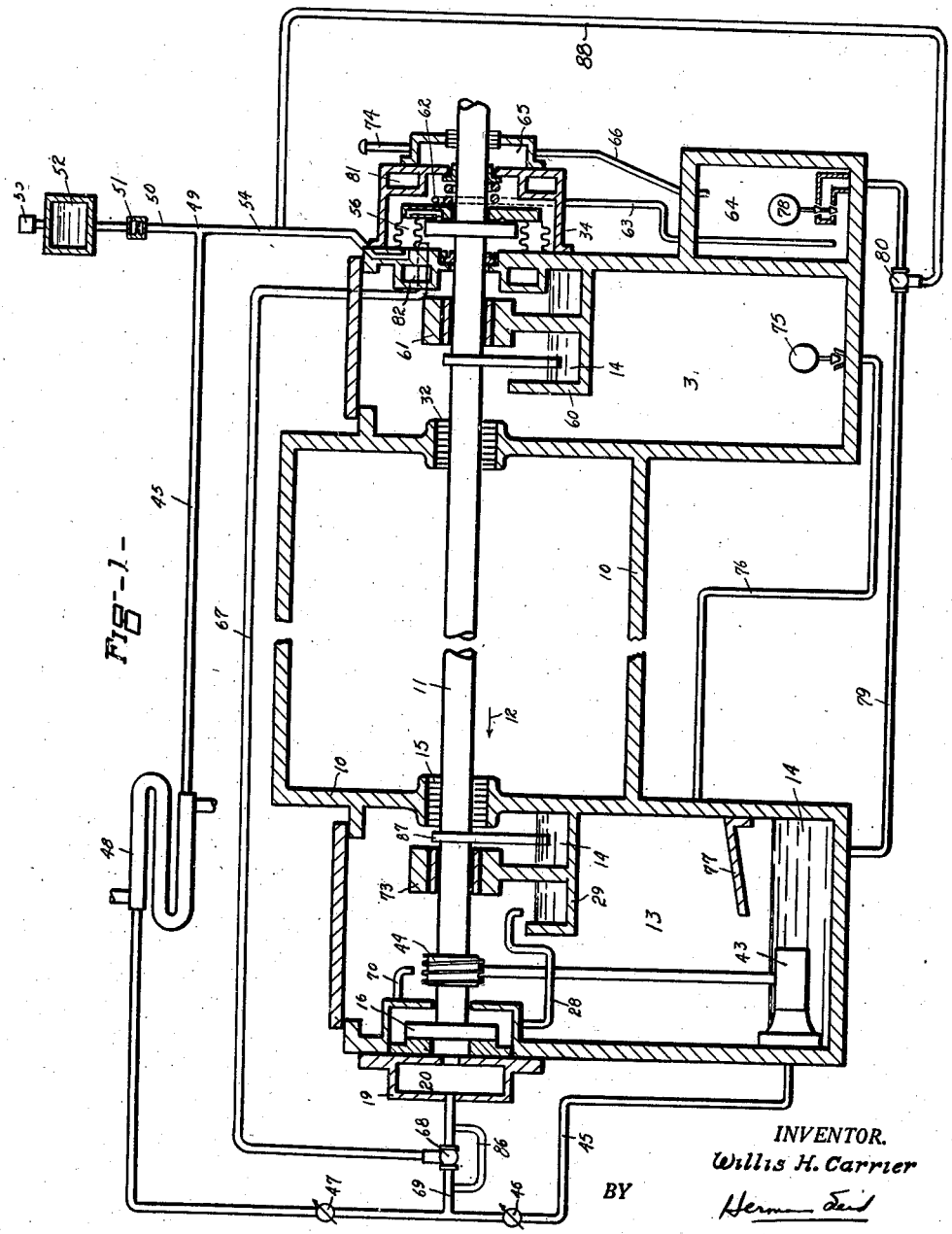
INVENTOR.
Willis H. Carrier
BY
ATTORNEYS.

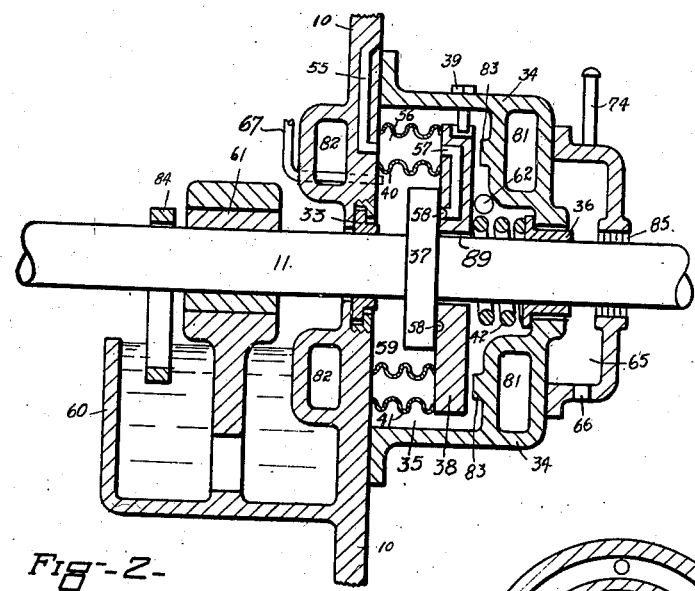
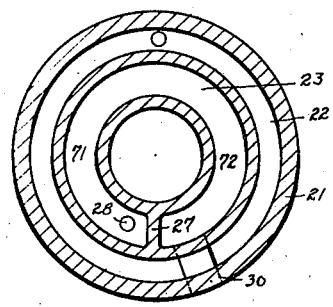
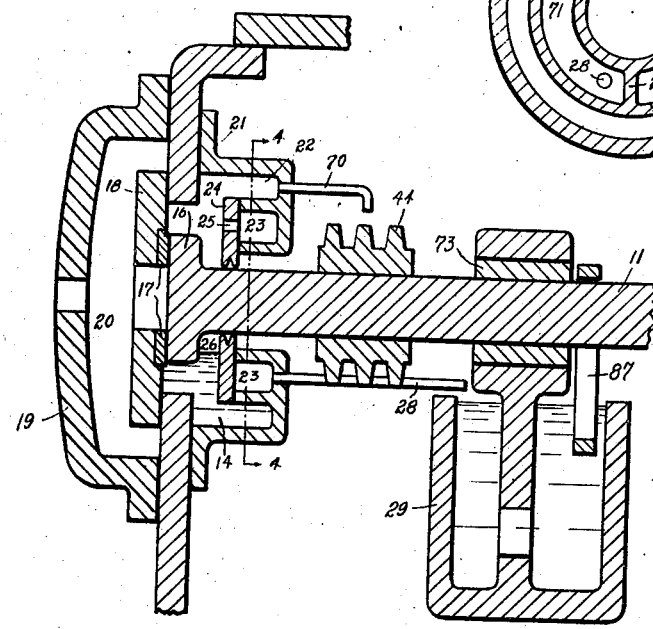

Patented Apr. 13, 1937

2,077,038

UNITED STATES PATENT OFFICE 2,077,038

SEALING AND THRUST BALANCING DEVICE

Willis H. Carrier, Elizabeth, N. J., assignor, by mesne assignments, to Carrier Corporation, Newark, N. J., a corporation of Delaware Application April 5, 1934, Serial No. 719,143

19 Claims. (Cl. 184—6)

This invention relates to vapor pumps, and more particularly, to the proper lubrication and sealing of rotary or centrifugal compressors.

In usual pump practice, it has not been found expedient, or generally practicable to enclose the pump and its driving motor in a single casing. Hence, at the point at which the impeller shaft projects through the pump casing, some form of sealing device must be provided for the purpose of preventing the ingress of air into the pump, or conversely, the egress of vapor therefrom. Further, there is usually a difference in pressure between the ends of the pump, which in combination with other factors, tends to give the shaft an endwise thrust. While other arrangements might be utilized, applicant prefers to place his thrust balancing means at one end of the pump, and his sealing device at the other; and to make the impeller shaft relatively immovable along its axis. Further, in pumps of this type, it is usual to operate at high rotative speeds, i. e., several thousand revolutions per minute. At such speeds, it is self-evident that the ordinary type stuffing box would be absolutely impractical.

The principal object of the invention is to provide an improved and simplified oiling system for a high speed rotary pump, or compressor, which system will serve to lubricate bearings, to remove heat therefrom, and to supply a liquid seal for preventing ingress of air into, or egress of vapor out of the compressor.

It is another object of this invention to provide a sealing, or stuffing box, device which is highly efficient in preventing the admission of air into, or gas from, the pump, either when it is in operation, or when it is idle; and further, which is practically frictionless even at the high rotative speed encountered in this type of pump.

Another object of the invention is to provide suitable means for balancing the endwise thrust of the pump shaft.

A further object of the invention is to incorporate both the sealing means, and the thrust balancing means in the ordinary lubricating system of the pump in order that parasitic equipment may be reduced to a minimum.

It is still another object of the invention to supply an excess quantity of lubricant to both the sealing means and the thrust balancing means, and to utilize this excess for lubricating the journal bearings, and auxiliaries.

It is a further object of the invention to utilize the lubricating medium for removing heat from the sealing and thrust balancing means.

It is another object of the invention to reduce to a minimum the absorption of vapor by the sealing and lubricating fluid; and substantially to prevent the loss of both the vapor and the sealing fluid.

It is a further object of the invention to prevent undue frothing of the lubricant in the reservoir by introducing lubricant, highly saturated with refrigerant vapor, into the reservoir in the form of a thin film at a point above the normal liquid level in the reservoir whereby the vapor contained in the oil will be removed therefrom before the oil enters into and mixes with the oil in the reservoir.

A still further object of the invention is to insure the complete opening of the sealing device, and the creation of a desired liquid pressure therein prior to the admission of liquid to the thrust balancing device.

A feature of the invention resides in the provision of a sealing member attached to and rotating with the impeller shaft, and a laterally-movable, non-rotating sealing member adapted to move into and out of contact with said rotating member.

Another feature of the invention resides in use of a plurality of bellows between a stationary casing member and the laterally-movable, non-rotating sealing member, the purpose of which is to provide oil to the sealing members, to insure easy and free movement to the laterally movable sealing member, and to permit self-alignment of the moving and non-rotating parts.

Still another feature of the invention resides in the supply of lubricating fluid from a central reservior both to the sealing device, and to the thrust balancing device under pressure; and from these two elements to the impeller shaft journal bearings.

A further feature of the invention resides in subjecting the lubricant reservoir to the suction pressure of the compressor whereby oil may be returned from the discharge end of the compressor without the use of a pump, and whereby the pressure on the lubricant may be reduced to cause a separation of the refrigerant vapor from the lubricant liquid.

Other objects and features making for increased efficiency and improved operation will in part be obvious and will in part appear hereinafter.

Fig. 1 is a fragmentary sectional elevation of a centrifugal compressor showing the sealing device located at one end thereof, the thrust balancing device located at the other end thereof, and the interconnected lubricating system, the figure being largely diagrammatic.

Fig. 2 is a sectional elevation of the sealing device.

Fig. 3 is an elevation, in section, of the thrust balancing device, and

Fig. 4 is a sectional view taken on the line 4—4 of Fig. 3.

In the drawings, similar designations referring to similar parts, numeral 10 designates the casing of a centrifugal vapor compressor, or pump, and 11 the shaft on which suitable impellers are mounted. Since the construction of the compressor forms no part of this invention, it has not been illustrated in detail. It is sufficient for the purpose of this invention to understand that the compressor inlet is at the lefthand end and the vapor outlet or pressure chamber is at the righthand end of the casing 10, as shown in Fig. 1; that the shaft 11 extends through casing 10 at one end thereof, preferably at the high pressure end for connection to a suitable driving motor; that during operation, there is imparted to the shaft a thrust effect, which thrust is in the direction indicated by arrow 12; and that the lefthand end of the compressor is subjected to the low pressure existing at the vapor inlet while the righthand end is subjected to the high pressure existing at the vapor outlet.

Considering first the thrust balancing device (see Figs. 1 and 3), numeral 13 indicates a chamber formed at the lefthand end of the compressor, the lower part of which is utilized as a reservoir for oil 14. The chamber 13 is sealed against atmospheric pressure, but is separated from the compressor only by means of labyrinth rings 15 and hence, this chamber is subjected to the inlet pressure of the compressor. Labyrinth rings 15 may be of any desired type. Since labyrinth construction is well known in the art, and, per se, forms no part of this invention, they have been illustrated diagrammatically. A bearing plate 16 (Fig. 3) is formed on the end of the shaft 11 and may be, if desired, an integral part thereof. A plurality of thrust blocks 17 are mounted upon and supported by a suitable backing plate 18 in such a manner that their thrust surfaces are directly opposed to the bearing plate 16. A cover plate 19 forms a chamber 20 at the rear of the thrust bearing assembly to which oil is supplied in a manner hereinafter to be described. A casting 21 covering the front portion of the thrust assembly is divided into two concentric annular chambers 22 and 23. The inner annular chamber 23 is covered by an element 24 in which a plurality of holes 25 provide access from chamber 26 to chamber 23. It is of note that holes 25 are all located above the center line of shaft 11, and hence, a quantity of oil will always be retained in the bottom of chamber 26. Further, in the inner chamber 23 (see Fig. 4) is positioned partition 27. Thus, two separate columns of oil may be accumulated in chamber 23, one on each side of partition 27. These columns of oil will remain separate unless each of them rises to a height above the crest of the inner wall of chamber 23. Pipe 28 provides a passageway for supplying oil from one of these columns to the bearing well 29. Oil from the other column drains through opening 30 into the reservoir formed in the bottom of chamber 13.

Considering now the sealing device (see Figs. 1 and 2), a chamber 31 is formed at the righthand end of the compressor and since it is separated therefrom only by the labyrinth rings 32, this chamber is subjected to the compressor discharge pressure. At the point at which the shaft 11 passes through the wall of this chamber, an inner floating ring 33 is provided. A casting 34 is supported on the casing 10 and forms therewith a sealing chamber 35 and at the point at which the shaft 11 passes out of this sealing chamber, a second or outer floating ring 36 is provided. Mounted on the shaft 11 is a rotating sealing member 37 which member has no lateral movement but rotates with the shaft. A non-rotating sealing member 38, held against rotation by pin 39, is mounted within the chamber and has its inner face directly opposed to the face of a rotating sealing member 37. Two concentric bellows elements 40 and 41, respectively, join the face of plate 38 to the face of the casing 10; provide a sealed passageway 56 for oil, as will later be described; allow a lateral movement of the plate 38 into and out of engagement with the face of plate 37; and further, allow the non-rotating plate to align itself with the face of rotating plate 37. A spring 42 is held in compression between the rear face of plate 38 and the face of the outer floating ring 36, thus tending to force the plate 38 against plate 37 and to force the floating ring outward against the face of casting 34.

Considering now the operation of the device, a pump 43, located in chamber 13, and driven through a suitable worm gear 44, withdraws oil from the base of chamber 13 and forces this oil through pipe 45, check valve 46, check valve 47, oil cooler 48, to a point 49. From point 49, one portion of the oil is discharged upwardly through pipe 50, restriction 51 and into an auxiliary reservoir 52. A vent valve 53 allows air to be forced out of the reservoir 52, but when the reservoir is filled, it prevents the discharge of any oil. The remaining portion of the oil is forced downwardly through pipe 54, into the passageway 55 (see Fig. 2), formed in casing 10, into the chamber 56, and into the passageway 57, formed in the plate 38. The oil flows into an annular groove 58, formed in the face of plate 38. When sufficient pressure is built up within the chamber 56, the oil forces plate 38 against the compression of spring 42 and moves the plate out of engagement with the rotating sealing member 37 and further allows a flow of oil from chamber 56 on to the face of plate 37. Suitable stop elements 83 determine the lateral movement of plate 38, and hence, determine the opening between the opposed faces of rotating plate 37 and non-rotating plate 38. At this point, the oil is divided into two portions, one of which flows to the outer edges of the rotating plate and fills up the chamber 59, from which chamber a portion of the oil works its way past the inner sealing ring and falls into the bearing well 60. Suitable oiling rings 84 lift the oil from the bearing well 60 for the purpose of lubricating the journal bearing 61. Any excess oil overflows into chamber 31. The other portion of the oil is forced inwardly towards the shaft 11, passes through passageway 89, comprising the space between the shaft and the hole in plate 38, into the chamber 35, from which chamber it overflows through hole 62 and pipe 63 into atmospheric chamber 64. The oil in passing through the restricted passageway formed between shaft 11 and the hole in plate 38 will be expanded from the pressure existing in restriction 57 to the pressure in chamber 35 which is substantially atmospheric. Hence, the only oil pressure exerted against sealing ring 36 will be that which is due to the slight head of oil. Some of the oil will, of course, seep past the outer sealing ring and will be collected in chamber 65 and drained through pipe 66 into chamber 64. Suitable labyrinth rings 85 prevent any oil from flowing out of the compressor along shaft 11.

To prevent excess heating up of the seal assembly, and the oil contained therein, two annular cooling chambers 81 and 82 are provided, through which water or other suitable cooling medium is circulated.

When chamber 59 is completely filled and a predetermined pressure built up therein, this pressure will be transmitted through control line 67 and will cause valve 68 to open. Thereupon, oil will be admitted from pipe 45 through pipe 69 into chamber 20 of the thrust bearing. Oil will force its way between the thrust blocks 17 into the chamber 26, from which a portion of the oil is led off through the outer annular chamber 22 and pipe 70 to lubricate the worm gear 44. The remaining portion of the oil flows through holes 25 into chamber 23. As was previously described, partition 27, in effect, divides this chamber into two half chambers. When the oil has completely filled one side, designated 71, it may then flow over into the other side 72, and from there into the reservoir formed in the base of chamber 13. From the chamber 71, the oil is withdrawn through pipe 28 to the bearing well 29, from which, by means of suitable oil rings 87, the journal bearing 73 is lubricated. Any excess will overflow the well 29 and fall into the reservoir formed in the bottom of chamber 13.

When the compressor is first started, it is apparent that the thrust effect is quite low, and consequently, the friction and heat generated thereby, is correspondingly low. Hence, the quantity of oil trapped in the lower part of chamber 26 (holes 25 all being above the center line of shaft 11) is entirely adequate for lubricating the thrust bearing. However, to prevent any possibility of the thrust bearing running dry before valve 68 opens a small bypass passage 86 may be provided to admit a small quantity of oil to the bearing at all times.

As the speed of shaft 11 is increased and the machine picks up its load, the thrust increases. While a small quantity of oil might be entirely adequate for lubrication purposes, if the bearing were cooled by independent means, it would not be sufficient, in itself, to remove the heat generated. Applicant achieves the same end, i. e., cooling and lubricating the thrust bearing, more economically by supplying an excess quantity of oil to the thrust bearing for removing heat, and then using the excess for lubricating both the worm gear 44, and journal bearing 73.

Considering now the return of oil to the reservoir 13, it should be remembered that chamber 31 is subjected to the discharge pressure of the compressor and chamber 64 to atmospheric pressure (through vent 74 and pipe 66), both of which pressures are greater than the pressure existing in chamber 13. Hence, no pump is required for returning the oil.

The oil in its passage through the machine has a definite tendency to absorb a portion of the refrigerant vapor with which it comes into contact, and its capacity to absorb is a function of its temperature, and of the pressure of the refrigerant vapor which it contacts. As is readily understood, the presence of this absorbed gas in undesirably large quantities may completely ruin the lubricating qualities of the oil. However, the vapor can be removed by subjecting the oil to a lower temperature. To this end, then, the oil reservoir 13 is placed on the suction side of the machine. The oil in chamber 31 is subjected to vapor at a pressure corresponding to the compressor discharge pressure, and hence, it will absorb a relatively large quantity of refrigerant vapor. Further, this oil is heated up very materially by contact with the walls of the compressor. If this oil were discharged into the bottom of reservoir 13, it is apparent that the pressure reduction, plus its great heat, would cause a violent boiling which would result in excessive frothing. To prevent this, applicant returns the oil through pipe 76, under control of a float valve 75, over a shelf 77 preferably positioned above the normal oil level in the reservoir. The resulting thin film of oil presents a relatively large surface, and consequently, the reduced pressure in chamber 13 is most effective in vaporizing and drawing off the absorbed refrigerant, the rectified oil then entering the reservoir, no excessive frothing being produced.

Since the oil in chambers 35, 65 and 64 does not contact refrigerant vapor at the discharge end of the compressor, it is apparent that it will not be highly saturated. Further, since it has been cooled by cooling chamber 81, and hence is cooler than the oil in chamber 31, it is desirable to avoid a precipitate mixing of the two. Thus, the oil from chamber 64 is returned to the bottom of the reservoir through pipe 79. However, the oil will contain some refrigerant. Hence, it is not desirable to have a varying oil level in chamber 64, the possible effect of which would be to pump air (through vent 74) into and out of the chamber, thereby effecting a loss of refrigerant vapor. To prevent such variations, a throttling type float valve 78 is provided, which valve tends to keep a constant oil level in chamber 64. However, this type valve has a tendency to leak even when supposedly fully closed. To prevent any possibility of the chamber emptying and allowing a flow of air into the machine, applicant provides a positive acting stop valve 80 in the line 79. While the valve may be of any construction, applicant prefers to use a valve of the quick-acting type. Control line 88 connects valve 80 and line 54, and causes valve 80 to open whenever the oil pressure in line 54 rises above a predetermined value. When the pressure in line 54 drops, the valve 80 is caused to close.

When the machine is stopped, thus stopping pump 43, the oil pressure in chamber 56 decreases and the plate 38 is forced by spring 42 into engagement with the face of rotating sealing member 37. In order to provide an oil seal during this time, the oil from reservoir 52 flows by gravity through restriction 51, pipe 50, pipe 54, passageway 55, chamber 56, and provides an adequate supply of oil between the faces of the rotating sealing member 37 and the non-rotating sealing member 38, thus effectively preventing the ingress of air into the machine, or conversely, the egress of vapor from the machine to the atmosphere. Thus, this sealing is effective both when the machine is in operation and when it is idle.

Since certain changes in carrying out the above process and in the constructions set forth, which embody the invention may be made without departing from its scope, it is intended that all matter contained in the above description or shown in the accompanying drawings shall be interpreted as illustrative and not in a limiting sense.

I claim:

1. In an oiling system for a fluid compressor having a rotary shaft extending through an opening in the compressor casing, a sealing device comprising a rotating sealing member on said shaft and a non-rotating sealing member which is adapted to move into and out of engagement with said rotating member, a thrust balancing device, journal bearings for said shaft, a lubricant reservoir subjected to the suction pressure of said compressor, a pump for discharging oil to said sealing device and to said thrust balancing device, and means for supplying lubricant from said sealing and thrust balancing devices to said journal bearings.

2. In an oiling system for a fluid compressor having a rotary shaft extending through an opening in the compressor casing, a sealing device including a rotating sealing member on said shaft and a non-rotating sealing member adapted to move into and out of engagement with said rotating member, a thrust balancing device, journal bearings for said shaft, an oil reservoir subjected to the suction pressure of said compressor, a valve responsive to variations in oil pressure within said sealing device, an expansible oil actuated means for opening said sealing device by causing the non-rotating member to move away from the rotating member, a pump for supplying oil from said reservoir to said expansible oil-actuated means and for supplying oil under the control of said valve to said thrust balancing device after said sealing device has opened, means for supplying oil from said sealing device to one of said journal bearings, and means for supplying oil from the thrust balancing device to another of said journal bearings.

3. In an oiling system for a fluid compressor having a rotary shaft extending through an opening in the compressor casing, a sealing device comprising a rotating sealing member on said shaft and a non-rotating sealing member adapted to move into and out of engagement with said rotating member, a thrust balancing device, journal bearings for said shaft, an oil reservoir subjected to the suction pressure of said compressor, an oil pump, means for supplying oil from said pump to said thrust balancing device, means for supplying oil from said thrust balancing device to one of said journal bearings, means for supplying oil from said pump to open said sealing device by moving the non-rotating member away from the rotating member and for supplying an oil seal therebetween, means for supplying a portion of the oil from said sealing device to another of said journal bearings, means for supplying another portion of oil from said sealing device to a chamber maintained at substantially atmospheric pressure, and means for returning oil to said reservoir both from said journal bearings and from said chamber.

4. In an oiling system for a fluid compressor having a rotary shaft extending through an opening in the compressor casing, a sealing device comprising a rotating sealing member on said shaft, and a non-rotating sealing member adapted to move into and out of engagement with said rotating member, journal bearings for said shaft, a first oil reservoir subjected to the suction pressure of said compressor, a pump for withdrawing oil from said first reservoir, means for supplying oil from said pump to an auxiliary reservoir located above said sealing device, means for supplying oil from said pump to open said sealing device for moving said non-rotating member away from said rotating member and for supplying an oil seal therebetween, means for supplying oil from said sealing device to one of said journal bearings, a restricted passageway for passing the oil into a chamber subjected to atmospheric pressure, means for returning oil from said journal bearing to the top of said first reservoir, and means for returning oil from said chamber to the bottom of said first reservoir, said auxiliary reservoir being adapted to maintain an oil seal in said sealing device when said pump is inoperative and said sealing device is closed.

5. In an oiling system for a fluid compressor having a rotary shaft extending through an opening in the compressor casing, a sealing device, journal bearings for said shaft, a first oil reservoir subjected to the suction pressure of said compressor, a pump for withdrawing oil from said first reservoir, means for supplying oil from said pump to an auxiliary reservoir located above said sealing device, means for supplying oil from said pump to open said sealing device and to supply an oil seal therein, means for supplying oil from said sealing device to one of said journal bearings, means comprising a restricted passageway for admitting oil under the pressure existing in said sealing device to a chamber maintained at atmospheric pressure, means for cooling the oil in said chamber, means for returning oil from said journal bearing to said first reservoir at a point above the oil level therein, means for returning the oil from said chamber to said first reservoir at a point below the oil level therein, and means for supplying oil from said auxiliary reservoir to said sealing device when the pump is inoperative and the sealing device closed.

6. In an oiling system for a fluid compressor having a rotary shaft extending through an opening in the compressor casing, an oil reservoir chamber subjected to the suction pressure of said compressor, a first oil collecting chamber subjected to the discharge pressure of said compressor, a second oil collecting chamber subjected substantially to atmospheric pressure, a thrust balancing device located within said reservoir chamber, a first journal bearing in said reservoir chamber, a sealing device comprising a rotating sealing member on said shaft and a non-rotating sealing member adapted to move into and out of engagement with said rotating member, a second journal bearing in said first oil collecting chamber, a pump for withdrawing oil from said reservoir chamber, means for supplying oil from said pump to said thrust balancing device, means for supplying oil from said thrust balancing device to said first journal bearing and from the bearing to said reservoir chamber, means for supplying oil from said pump to open said sealing device by moving the non-rotating member away from the rotating member and for supplying an oil seal therebetween, means for supplying oil from said sealing device to said second journal bearing and from this bearing to the first collecting chamber, means for supplying oil from the sealing device to said second collecting chamber, means for returning oil from said first collecting chamber to said reservoir at a point above the liquid level therein, and means for returning oil from the second collecting chamber to said reservoir proximate the bottom thereof.

7. In an oiling system for a fluid compressor having a rotary shaft extending through an opening in the compressor casing, an oil reservoir chamber subjected to the suction pressure of said compressor, a shelf in said reservoir chamber located above the oil level therein, a first collecting chamber subjected to the discharge pressure of said compressor, a second oil collecting chamber subjected to atmospheric pressure, a thrust balancing device in said reservoir chamber, a first journal bearing in said reservoir chamber, a sealing device for closing said opening in the compressor casing, a pump for withdrawing oil from said reservoir chamber, means for supplying oil from said pump to said thrust balancing device, means for supplying oil from the thrust balancing device to said first journal bearing and from this bearing to the reservoir chamber, means for supplying oil from the pump to said sealing device, means for supplying oil from the sealing device to said second journal bearing and from the bearing to said first oil collecting chamber, means for supplying oil to said second oil collecting chamber, means for returning oil from said first oil collecting chamber to said reservoir chamber over said shelf, and means for returning oil from said second collecting chamber to said reservoir chamber at a point proximate the bottom thereof.

8. In an oiling system for a fluid compressor, a chamber subjected to the suction pressure of said compressor, an oil reservoir in the bottom of said chamber, a liquid distributor in said chamber located above the oil level in said reservoir, a first oil collecting chamber subjected to the discharge pressure of said compressor, a second oil collecting chamber subjected to atmospheric pressure, means for supplying oil from said reservoir to both of said collecting chambers, means for returning oil from said first collecting chamber over said liquid distributor to said reservoir, and means for returning oil from said second chamber to said reservoir at a point proximate the bottom thereof.

9. In an oiling system for a fluid compressor having a rotary shaft extending through an opening in the compressor casing, an oil reservoir, a thrust balancing device, a sealing device comprising a rotating member on said shaft and a non-rotating member adapted to move into and out of engagement with the rotating member, means for supplying oil to open said sealing device by moving the non-rotating member away from the rotating member and for supplying an oil seal therebetween, means for supplying a small quantity of oil to said thrust balancing device, and means for supplying a larger quantity of oil to said thrust balancing device only after said sealing device has opened.

10. In an oiling system for a fluid compressor having a rotary shaft extending through an opening in the compressor casing, an oil reservoir, a thrust balancing device, a sealing device which is adapted to open and close, means for supplying oil from said reservoir to open said sealing device and to supply an oil seal therein, means for supplying oil from said reservoir to said thrust balancing device only after said sealing device has opened, and means for retaining a quantity of oil in said thrust balancing device for lubricating it during the time when no oil is being supplied from said reservoir.

11. In combination with a fluid compressor having a rotary shaft extending through an opening in the compressor casing, a journal bearing for said shaft, a sealing device comprising a rotating sealing member carried on said shaft and a non-rotating sealing member surrounding the shaft and adapted to move into and out of engagement with said rotating member, a housing for said sealing device, a bellows comprising a pair of concentric walls joining the non-rotating member to said housing, an inner chamber, the perimeter of said inner chamber being defined by the inner of said pair of concentric walls, a chamber formed between the bellows walls, an outer chamber formed within said housing, means for supplying oil to said bellows whereby the non-rotating member is moved away from the rotating member, means for supplying oil from the bellows between the faces of said sealing members and for filling said inner chamber, means for supplying oil from said inner chamber to said journal bearing, a restricted passageway formed between the shaft and the non-rotating member which surrounds it for reducing the pressure of oil flowing from between the faces of the members to the outer chamber, an overflow passage through which oil may drain to an atmospheric chamber, a spring for urging the non-rotating member towards the rotating member, an auxiliary chamber for collecting oil which escapes from the outer chamber, and a passage for drawing oil from the auxiliary chamber to the atmospheric chamber.

12. In an oiling system for a fluid compressor having a rotary shaft extending through an opening in the compressor casing, an oil reservoir, a thrust balancing device, a sealing device which is adapted to open and close, means for supplying oil from said reservoir to open said sealing device and to supply an oil seal therein, means for retaining a quantity of oil in said thrust balancing device, and means for supplying an excess quantity of oil from said reservoir to said thrust balancing device only when said sealing device is open, said excess oil being supplied for the purpose of cooling the thrust balancing device.

13. In combination with a fluid compressor having a rotary shaft extending through an opening in the compressor casing, of a sealing device comprising a rotating sealing member carried on said shaft and a non-rotating sealing member surrounding the shaft and adapted to move into and out of engagement with said rotating member, a spring for urging said non-rotating member into engagement with said rotating member, a housing for said sealing device, a first floating ring surrounding said shaft at the point at which the shaft enters the housing, a second floating ring surrounding the shaft at the point at which the shaft passes out of the housing, a pair of concentric bellows joining the non-rotating member to the housing, an inner chamber, a bellows chamber, an outer chamber, a passage leading into said bellows chamber, a passageway leading from the bellows chamber to the face of the non-rotating member, a restricted passageway leading into the outer chamber, an overflow passageway from said outer chamber, oil collecting means proximate said first floating ring, and oil collecting means proximate said second floating ring.

14. In combination with a fluid compressor having a rotary shaft extending through an opening in the compressor casing, of a sealing device comprising a rotating sealing member and a non-rotating sealing member adapted to move into and out of engagement with said rotating member, a housing for said sealing device, a pair of concentric bellows joining said non-rotating member to said housing and forming a chamber therebetween, a passageway leading from said chamber to the face of said non-rotating member, means for admitting oil under pressure to said chamber to force said non-rotating member out of engagement with said rotating member, and a spring for forcing said non-rotating member into engagement with said rotating member.

15. In combination with a fluid compressor having a rotary shaft extending through an opening in the compressor casing, of a sealing device comprising a rotating sealing member and a non-rotating sealing member adapted to move into and out of engagement with the sealing member, a housing for said sealing device, a pair of concentr. bellows joining said non-rotating member to said housing and forming a chamber therebetween, means for admitting oil under pressure to said chamber to force the non-rotating member out of engagement with said rotating member, stop means for limiting the movement of said non-rotating member, and a spring for forcing the non-rotating member into engagement with the rotating member when the pressure on the oil in the chamber is relieved.

16. In combination with a fluid compressor having a rotary shaft extending through an opening in the compressor casing of a sealing device comprising a rotating sealing member and a non-rotating sealing member adapted to move into and out of engagement with said rotating member, a housing for said sealing device, a pair of concentric bellows joining said non-rotating member to said housing and forming a chamber therebetween, a passageway leading from said chamber to the face of said non-rotating member, means for admitting oil at relatively high pressure to said chamber to force said non-rotating member away from said rotating member and for supplying an oil seal therebetween, means for forcing said non-rotating member into engagement with said rotating member, and means for supplying oil at relatively slight pressure to said chamber when said non-rotating member is in engagement with said rotating member.

17. In combination with a fluid compressor having a rotary shaft extending through an opening in the compressor casing of a sealing device comprising a rotating sealing member and a non-rotating sealing member adapted to move into and out of engagement with said rotating member, a housing for said sealing device, a pair of concentric bellows joining said non-rotating member to said housing and forming a chamber therebetween, a pump, means for admitting oil from said pump to said chamber for forcing the non-rotating member away from said rotating member, a passageway for admitting oil from said chamber to the face of said non-rotating member, a spring for forcing said non-rotating member into engagement with said rotating member when said pump is inoperative, and means for admitting oil under relatively slight pressure to said bellows chamber and the face of said non-rotating member when the sealing members are engaged.

18. In combination with a fluid compressor having a rotary shaft extending through an opening in the compressor casing of a sealing device comprising a rotating member on said shaft, a non-rotating member surrounding said shaft and adapted to move into and out of engagement with said rotating member, a housing for said sealing device, a bellows comprising a pair of concentric walls, a bellows chamber between said walls, said walls joining said non-rotating member to said housing, a pump, means for admitting oil from said pump to said chamber for forcing the non-rotating member away from the rotating member, stop means for limiting the movement of said non-rotating means, a passageway for admitting oil from the chamber to the face of said non-rotating member, a spring for forcing said non-rotating member into engagement with said rotating member when said pump is inoperative, and means for admitting oil under slight pressure to said chamber and to the face of said non-rotating member when the sealing members are engaged.

19. In a sealing device of the character described, a first member mounted on a shaft and adapted to rotate about a given axis, a second member arranged to move back and forth along said axis, said members engaging and disengaging responsive to the movement of said second member, expansible fluid actuated means for causing said members to disengage, and means for causing said members to engage.

WILLIS H. CARRIER.